United States Patent [19]

Tokura

[11] 4,424,671

[45] Jan. 10, 1984

[54] EXHAUST GAS PARTICLE BURNING METHOD AND APPARATUS FOR AN INTERNAL COMBUSTION ENGINE

[75] Inventor: Naomi Tokura, Yokosuka, Japan

[73] Assignee: Nissan Motor Company, Limited, Kanagawa, Japan

[21] Appl. No.: 350,393

[22] Filed: Feb. 19, 1982

[30] Foreign Application Priority Data

Feb. 20, 1981 [JP] Japan .................................. 56-22107

[51] Int. Cl.³ .............................................. F01N 3/02
[52] U.S. Cl. ........................................ 60/274; 60/286; 60/311
[58] Field of Search .................. 60/274, 286, 303, 311

[56] References Cited

U.S. PATENT DOCUMENTS 4,211,075 7/1980 Ludecke ................................ 60/303
4,345,431 8/1982 Suzuki .................................. 60/303

FOREIGN PATENT DOCUMENTS 2815365 1/1979 Fed. Rep. of Germany ........ 60/303

*Primary Examiner*—Douglas Hart
*Attorney, Agent, or Firm*—Lowe, King, Price & Becker

[57] ABSTRACT

An exhaust gas particle burning-away method for an internal combustion engine in which a burner is operated for a predetermined period of time the first time the engine idles after the detected exhaust gas pressure on the upstream side of a filter has exceeded a stored reference exhaust gas pressure predetermined according to the detected engine speed and engine load. The apparatus according to the present invention comprises a memory unit, a comparator, an output unit including an idle switch and a timer, and various sensors such as an engine speed sensor, an engine load sensor, etc., in addition to a burner with a glow plug and a heater, and an exhaust gas filter. A control unit retrieves reference pressure values according to currently-detected engine speed and load, and compares the reference value to the current detected exhaust gas pressure. The output unit outputs a command signal for a predetermined length of time when the detected pressure exceeds the reference pressure and the engine is idling. The command signal causes a fuel pump for the burner and a glow plug for the burner both to operate. The predetermined length of time is sufficient to burn away the accumulated exhaust gas particles.

12 Claims, 2 Drawing Figures

EXHAUST GAS PARTICLE BURNING METHOD AND APPARATUS FOR AN INTERNAL COMBUSTION ENGINE

BACKGROUND OF THE INVENTION

The present invention relates generally to an exhausted gas particle combustion control method or apparatus for an internal combustion engine which can burn away particles from gaseous exhaust gas emitted from an internal combustion engine under predetermined conditions after the particles have been trapped by a filter.

DESCRIPTION OF THE PRIOR ART

The prior art of the present invention will be explained mainly with respect to its shortcomings.

It is well-known that particles suspended in exhaust gas emitted from an internal combustion engine can be trapped by a filter disposed within the engine exhaust system in order to prevent particles such as carbon from being emitted into the atmosphere. In this case, however, their exists a problem in that the particles trapped by the filter increase the aerodynamic resistance across the filter, with the result that the pressure of the exhaust gas increases, the output of the engine decreases, and the exhaust gas emission performance deteriorates.

To overcome these problems, there is usually provided a burner for burning away the particles suspended in exhaust gas on the upstream side of inlet port of the filter. This burner is automatically activated only when the exhaust gas pressure at the filter inlet port exceeds predetermined levels which vary according to engine speed and engine load, or only when a predetermined period of time counted by a timer has elapsed regardless of exhaust gas pressure. Since the burner raises the temperature near the filter inlet port beyond the combustion temperature of the particles, the particles trapped by the filter are burnt off, so that the filter is prevented from becoming clogged.

In the prior-art exhaust gas particle combustion apparatus explained above, however, there exist some problems as follows:

In the case where the burner is activated in response to exhaust gas pressure, since the exhaust gas pressure is not constant but rather fluctuates continuously, and also since the flow of the exhaust gas varies according to the engine speed, it is very difficult to control the heat quantity emitted by the burner (the amount of fuel to be supplied) in response to the flow of exhaust gas, that is, engine speed. Particularly, when the burner is activated at a high engine speed, a large amount of fuel is required, and thus the fuel is not used economically.

In the case where the burner is activated at regular intervals, since no exhaust gas pressure sensor exists, when the exhaust gas pressure rises excessively, the engine output performance and gas exhaust performance deteriorate. If the burner is activated frequently in order to eliminate this drawback, a large amount of fuel must necessarily be consumed to burn away the particles.

SUMMARY OF THE INVENTION

With these problems in mind, therefore, it is the primary object of the present invention to provide an exhaust gas particle combustion control method and apparatus for an internal combustion engine by which the particles trapped by a filter can be burnt away using a minimum amount of fuel and without adversely effecting engine output performance and gas exhaust emission performance.

To achieve the above-mentioned objects, the exhaust gas particle combustion control method according to the present invention comprises the steps of storing reference (upper limit) exhaust gas pressure values allocated according to engine operating conditions, detecting exhaust gas pressure, comparing the detected exhaust gas pressure with the stored one and activating a burner for a predetermined period of time the first time the engine idles after the detected exhaust gas pressure has exceeded the stored reference exhaust gas pressure.

Furthermore, to achieve the above-mentioned object, the exhaust gas particle combustion control apparatus according to the present invention comprises a controller including a memory unit for storing reference exhaust gas pressure values allocated according to engine operating conditions, a comparator for comparing detected exhaust gas pressure with the stored reference pressure values and an output unit including an idle switch and a timer, in addition to engine operating condition sensors (engine speed, engine load), an exhaust gas pressure sensor, a burner, a fuel filter, etc.

The method and the apparatus for the exhaust gas particle combustion control according to the present invention have the advantage that since the burner is activated for a predetermined period of time the first time the engine idles after the detected exhaust gas pressure has exceeded the stored reference value, it is possible to burn away the particles trapped by the filter while consuming the minimum amount of fuel, thus realizing high reliability and low fuel cost.

BRIEF DESCRIPTION OF THE DRAWINGS

The features and advantages of the exhaust gas particle combustion control method and apparatus for an internal combustion engine according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Referring now particularly to the attached drawings, an exhaust gas particle combustion control method and apparatus for an internal combustion engine according to the present invention will be described.

Figure 1:
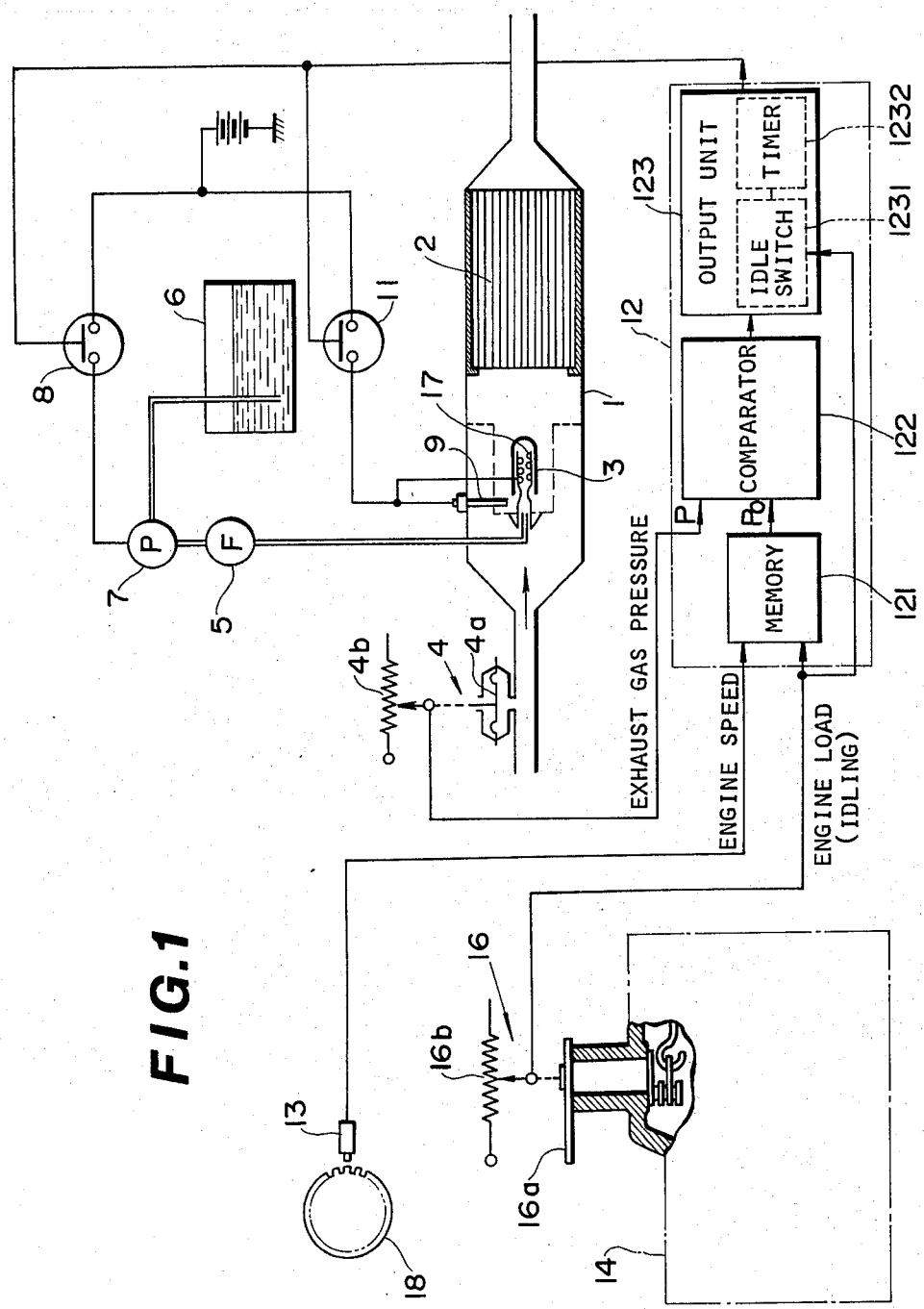
FIG. 1 is a diagrammatic illustration of an exhaust gas particle combustion control apparatus for an internal combustion engine according to the present invention.

In FIG. 1, the reference numeral 1 denotes a filter case disposed in an exhaust gas system for an engine (not shown), and the reference numeral 2 denotes a filter disposed within the filter case 1 to trap and collect particles such as carbon ash suspended in exhaust gas. The reference numeral 3 denotes a burner disposed on the upstream side of the filter 2 in the filter case 1 for reheating the exhaust in order to burn out the particles in the exhaust gas. The reference numeral 4 denotes an exhaust gas pressure sensor disposed upstream of the burner 3. To the above-mentioned burner 3, there are connected a pump relay 8 for controlling a fuel pump 7 to feed fuel from a fuel tank 6 to the burner 3 through a fuel filter 5 at an appropriate pressure. In addition to this pump relay 8, a glow relay 11 is connected to control current supplied to a glow plug 9 for the burner 3. In parallel with this glow plug 9, a heater 17 is connected to facilitate the ignition of fuel in cooperation with the glow plug 9. The heater 17 is located along a pre-heating passage for fuel provided in the burner 3.

The reference numeral 12 denotes a controller, the output terminal of which is connected to the pump relay 8 and the glow relay 11. To the controller, there are connected the output of the exhaust gas pressure sensor 4 and the outputs of engine operating condition sensors 13 and 16.

The exhaust gas pressure sensor 4 includes a diaphragm 4a moved according to the value of exhaust gas pressure and a potentiometer 4b connected to the diaphragm 4a. In this sensor, the value of exhaust gas pressure is detected by the diaphragm and the voltage value of the potentiometer changes in response to the movement of the diaphragm.

The engine operating condition sensors are, for instance, an engine speed sensor 13 for detecting the revolution speed of a crankshaft 18 and a load sensor 16 for detecting engine load.

The engine speed sensor 13 detects the revolution speed of the crankshaft 18 electromagnetically or photoelectronically.

The engine load sensor 16 includes a control lever 16a for a fuel injection pump 14 and another potentiometer 16b. In this sensor, the control angle of the control lever 16a is used to determine the output of the potentiometer 16b.

The controller 12 comprises a memory 121, a comparator 122 and an output unit 123 including an idle switch 1231 and a timer 1232. In the memory 121, various exhaust gas pressure upper limit values at the filter inlet port are stored in addresses allocated according to engine operating conditions such as engine speed and engine load. The comparator 122 compares the pressure value actually detected by the exhaust gas pressure sensor 4 with the pressure value previously stored in the memory 121, and switches to an "operate" state when the detected value exceeds the stored one. The output unit 123 serves to apply an output signal to the pump relay 8 and the glow plug 9 to operate them to burn away the particles trapped by the filter 2 under some conditions described below.

Detailed structure of the comparator 122 will be obvious to those skilled in the electronic art. For example, a common operational amplifier could receive the reference and detected pressure as inputs and its output could be monitored by a latch circuit gated by the idle switch 1231.

The output unit 123 includes the idle switch 1231, which is turned on when the engine load sensor 16 detects engine idling, and the timer 1231, which is started when the idle switch is turned on to count a predetermined period of time. While the timer 1232 is operating, the output unit 123 is opened to apply an "operate" signal from the comparator to the pump relay 8 and the glow relay 11 in order to operate the burner 3. IN addition, the timer resets the comparator to its initial "non-operate" state at the end of the predetermined period of time.

Now follows a description of operation of the exhaust gas particle combustion control apparatus according to the present invention.

In the apparatus described above, exhaust gas emitted from an engine is fed into the filter case 1 and cleaned by the filter 2; that is, the particles suspended in the exhaust gas are trapped by the filter. The amount of particles collected thereby, that is, the degree of filter clogging, increases with increasing engine operation time. As the degree of clogging increases, since aerodynamic resistance also increases across the filter 2, the exhaust gas pressure on the upstream side of the filter 2 rises in proportion to the degree of clogging.

The exhaust gas pressure on the upstream side of the filter is detected by the exhaust gas pressure sensor 4 and inputted to the comparator 122 in the controller 12.

On the other hand, the engine speed is detected by the engine speed sensor 13 and is inputted to the memory, and the engine load is detected by the engine load sensor 16 and is also inputted to the memory.

Since the memory outputs to the comparator 122 a signal Po representative of an upper-limit exhaust gas pressure (reference pressure) corresponding to the detected engine speed and engine load, the comparator 122 compares the exhaust gas pressure signal P detected by the sensor 4 with the upper-limit exhaust gas pressure signal Po stored in the memory 121, and switches to a state outputting an "operate" signal only when the detected signal level exceeds the reference signal level.

When the engine load sensor 16 detects engine idling, since the idle switch 1231 is turned on and therefore the timer 1232 starts counting a predetermined time period, the output unit 123 opens to apply the "operate" signal from the comparator 122 to the pump relay 8 and the glow relay 11, in order to operate the burner 3.

In other words, even if exhaust gas pressure excessively increases while the engine is running, the "operate" signal from the comparator 122 is not outputted, but is outputted only for a predetermined period of time after the first time the engine idles after the exhaust gas pressure has exceeded the upper limit.

The timer serves to reset the comparator at the end of the predetermined time period. In order to prevent excessive operation of the burner due to frequent idling during city driving, the timer may also be adapted to disable the idler switch during the predetermined period of time.

When these relays 8 and 11 are turned on, the fuel pump 7 begins to operate to pressure-feed the fuel within the fuel tank 6 to the burner 3 through the fuel filter 5, and at the same time the glow plug 9 and the heater 17 are heated to burn the fuel. Since the particles trapped by the filter 2 are heated beyond the combistion temperature of the particles, the particles are burnt away, so that the filter is prevented from becoming clogged.

In this embodiment, since the burner 3 is operated only while the engine is being idled, that is, only when the flow of exhaust gas is at a minimum under relatively stable conditions for a predetermined period of time, it is possible to reliably clean the filter 2 while consuming the minimum possible amount of fuel. If the burner is operated while the engine is running in a state other than idling, the amount of fuel to be used by the burner must be controlled according to variation in the amount of exhaust gas; however, in this embodiment, since there is no need of providing such function, the apparatus according to the present invention is simple.

Further, since the limits of exhaust gas pressure according to each engine speed and engine load have previously been stored in the memory 121 of the controller 12, it is possible to determine the degree of particle accumulation within the filter 2 under all engine operating conditions.

When the apparatus according to the present invention is used, it is possible to prevent excessive exhaust gas pressure due to filter clogging, thus the engine output performance and exhaust emission performance can be stabilized.

Figure 2:
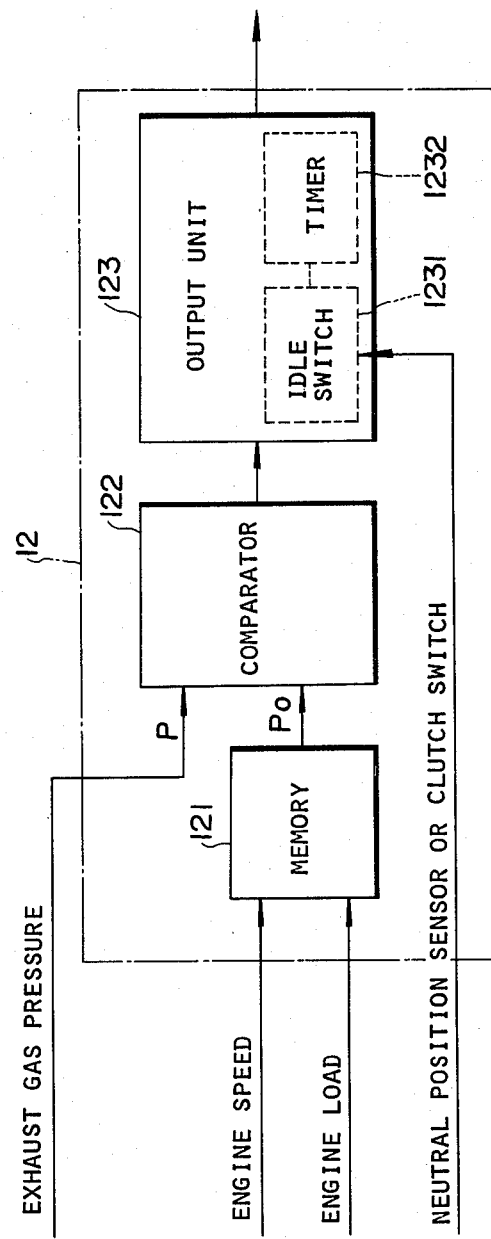
FIG. 2 is a diagrammatic illustration of part of another preferred embodiment of this invention.

Furthermore, in a second embodiment according to the present invention as shown in FIG. 2, the idle switch 1231 can be opened by using a neutral position sensor to detect the neutral position of a gear shift lever used for the transmission or a clutch sensor (switch) to detect the state where the clutch is disengaged.

As described above, in the exhaust gas particle combustion control method or apparatus for an internal combustion engine according to the present invention, since the reference or upper-limit exhaust gas pressure values on the upstream side of the filter are previously stored in the controller in accordance with engine speed and engine load, the detected exhaust gas pressure is compared with the reference value, and the burner is operated only for a predetermined period of time beginning the first time the engine idles after the detected exhaust gas pressure has exceeded the reference value, and the particles trapped by the filter are thereby burnt away, it is possible to prevent filter clogging due to particles suspended in exhaust gas, regardless of engine operating conditions.

Further, since the burner is operated during a predetermined time period, it is possible to efficiently burn away the particles while consuming a minimum, constant amount of fuel.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A method of burning away exhaust particles emitted by an internal combustion engine and collected on a filter by using a burner with a glow plug, which comprises the following steps of:
   (a) detecting exhaust gas pressure on the upstream side of the filter;
   (b) detecting at least one engine operating condition;
   (c) detecting engine idling;
   (d) storing various reference exhaust gas pressure limit values allocated according to the detected engine operating conditions;
   (e) comparing the detected exhaust gas pressure with the stored reference exhaust gas pressure limit value;
   (f) measuring a predetermined time period after engine idling condition has been detected; and
   (g) outputting a signal to supply fuel to the burner and to actuate the glow plug for the predetermined period of time after engine idling condition has been detected and the detected exhaust gas pressure has exceeded the stored reference gas pressure limit value according to the detected engine operating conditions.

2. A method of burning away exhaust particles as set forth in claim 1, wherein one of the detected engine operating conditions is engine speed.

3. A method of burning away exhaust particles as set forth in claim 1, wherein the at least one detected engine operating condition is engine load.

4. An apparatus for burning away exhaust particles emitted by an internal combustion engine and collected on a filter by using a burner, which comprises:
   (a) means for detecting exhaust gas pressure upstream of the filter and for generating signals corresponding thereto;
   (b) at least one means for detecting engine operating condition and for generating signals corresponding thereto;
   (c) means for detecting engine idling and for generating signals corresponding thereto;
   (d) a memory unit connected to said means for detecting engine operating conditions for storing various reference exhaust gas pressure limit values according to the detectable engine operating conditions and for generating signals corresponding thereto;
   (e) a comparator connected to said means for detecting exhaust gas pressure and said memory unit for comparing the detected exhaust gas pressure signal from said means for detecting exhaust gas pressure with the stored reference exhaust gas pressure limit value from said memory unit and for generating signals to operate the burner only when the detected exhaust gas pressure value exceeds the stored value Po; and
   (f) an output unit connected to said comparator for outputting the signal to operate the burner, which includes:
      (1) an idle switch provided in said output unit and turned on to output the signal to operate the burner when said means for detecting engine idling detects engine idling; and
      (2) a timer provided in said output unit for counting a predetermined time period after said idle switch is turned on, and for turning off said idle switch at the end of said predetermined time period,
   whereby said output unit generates the signal to operate the burner for a predetermined time period after said idle switch is first turned on after said comparator has outputted the signal thereto.

5. An apparatus for burning away exhaust particles as set forth in claim 1, which further comprises a heater connected in parallel with said glow plug for heating fuel supplied to the burner in order to facilitate the fuel ignition.

6. An apparatus for burning away exhaust particles as set forth in claim 4, wherein said means for detecting exhaust gas pressure comprises:
   (a) a diaphragm flexibly responsible to changes in pressure, one side of which is opened to exhaust gas and the other side of which is opened to atmosphere; and
   (b) a first potentiometer actuated by said diaphragm for outputting detected exhaust gas pressure signals, the voltage given by said first potentiometer being roughly proportional to the movement of said diaphragm.

7. An apparatus for burning away exhaust particles as set forth in claim 4, wherein said means for detecting engine operating conditions is an engine speed sensor.

8. An apparatus for burning away exhaust particles as set forth in claim 4, wherein said means for detecting engine operating conditions is an engine load sensor.

9. An apparatus for burning away exhaust particles as set forth in claim 8, wherein said engine load sensor comprises:
(a) a fuel injection pump;
(b) a control lever for controlling the amount of fuel to be supplied by said fuel injection pump; and
(c) a second potentiometer actuated by said control lever for outputting detected engine load signals, the voltage determined by said second potentiometer being roughly proportional to the movement of said control lever.

10. An apparatus for burning away exhaust particles as set forth in claim 8, wherein said engine load sensor also acts as said means for detecting engine idling.

11. An apparatus for burning away exhaust particles as set forth in claim 4, wherein said means for detecting engine idling is a shift-lever neutral position sensor for detecting when the transmission is in neutral gear.

12. An apparatus for burning away exhaust particles as set forth in claim 4, wherein said means for detecting engine idling is a clutch switch for detecting a clutch-disengagement position.

* * * * *